United States Patent
Boivie et al.

(10) Patent No.: US 9,477,845 B2
(45) Date of Patent: *Oct. 25, 2016

(54) SECURE APPLICATION DEBUGGING

(71) Applicant: INTERNATIONAL BUSINESS MACHINES CORPORATION, Armonk, NY (US)

(72) Inventors: Richard H. Boivie, Monroe, CT (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,426

(22) Filed: Dec. 2, 2015

(65) Prior Publication Data

US 2016/0085992 A1    Mar. 24, 2016

Related U.S. Application Data

(63) Continuation of application No. 14/105,635, filed on Dec. 13, 2013, now Pat. No. 9,235,692.

(51) Int. Cl.
  *G06F 21/62* (2013.01)
  *G06F 11/36* (2006.01)
  (Continued)

(52) U.S. Cl.
  CPC ......... *G06F 21/6281* (2013.01); *G06F 11/362* (2013.01); *G06F 11/3664* (2013.01);
  (Continued)

(58) Field of Classification Search
  None
  See application file for complete search history.

(56) References Cited

U.S. PATENT DOCUMENTS

| 5,222,139 A | 6/1993 | Takaragi et al. |
| 5,481,613 A | 1/1996 | Ford et al. |

(Continued)

FOREIGN PATENT DOCUMENTS

| CN | 102413022 A | 4/2012 |
| JP | 2006-209703 A | 8/2006 |

(Continued)

OTHER PUBLICATIONS

U.S. Appl. No. 14/101,916—Notice of Allowance mailed Jul. 22, 2015.

(Continued)

*Primary Examiner* — Michael R Vaughan
(74) *Attorney, Agent, or Firm* — Law Office of Jim Boice

(57) ABSTRACT

A method, system, and/or computer program product enables secure debugging of a software application. A first computer receives a secure software application from a second computer. Access to data used by the secure software application is protected by a security object, which allows a processor to access the data used by the secure software application without permitting data to exit unprotected from the processor. The first computer receives from the second computer an encrypted secure sidecar debugging application that is designed to debug the secure software application. In response to detecting an error in execution of the secure software application within the first computer, the first computer transmits the secure software application and the secure sidecar debugging application to the second computer, such that the second computer is enabled to decrypt the secure sidecar debugging application and to debug the secure software application.

18 Claims, 7 Drawing Sheets

(51) Int. Cl.
*G06F 21/12* (2013.01)
*G06F 21/14* (2013.01)
*G06F 21/52* (2013.01)
*G06F 21/60* (2013.01)

(52) U.S. Cl.
CPC ............... *G06F21/12* (2013.01); *G06F 21/14* (2013.01); *G06F 21/52* (2013.01); *G06F 21/602* (2013.01); *G06F 21/606* (2013.01); *G06F 2221/07* (2013.01); *G06F 2221/2101* (2013.01)

(56) References Cited

U.S. PATENT DOCUMENTS

| | | | |
|---|---|---|---|
| 5,615,263 A | 3/1997 | Takahashi | |
| 5,845,281 A | 12/1998 | Benson et al. | |
| 6,000,016 A | 12/1999 | Curtis et al. | |
| 6,185,685 B1 | 2/2001 | Morgan et al. | |
| 6,397,331 B1 | 5/2002 | Ober et al. | |
| 6,523,118 B1 | 2/2003 | Buer | |
| 6,704,871 B1 | 3/2004 | Kaplan et al. | |
| 6,708,273 B1 | 3/2004 | Ober et al. | |
| 6,751,709 B2 | 6/2004 | Seidl et al. | |
| 6,968,420 B1 | 11/2005 | Giles et al. | |
| 7,043,616 B1 | 5/2006 | McGrath | |
| 7,055,040 B2 | 5/2006 | Klemba et al. | |
| 7,167,956 B1 | 1/2007 | Wright et al. | |
| 7,249,225 B1 | 7/2007 | Seidl et al. | |
| 7,260,726 B1 | 8/2007 | Doe et al. | |
| 7,281,138 B1 | 10/2007 | Di Benedetto | |
| 7,290,288 B2 | 10/2007 | Gregg et al. | |
| 7,413,113 B1 | 8/2008 | Zhu | |
| 7,483,930 B1 | 1/2009 | Wright et al. | |
| 7,673,180 B1 | 3/2010 | Chen et al. | |
| 7,920,851 B2 | 4/2011 | Moshir et al. | |
| 7,933,413 B2 | 4/2011 | Steeves et al. | |
| 8,002,175 B2 | 8/2011 | Kuriyama et al. | |
| 8,041,947 B2 | 10/2011 | O'Brien et al. | |
| 8,055,910 B2 | 11/2011 | Kocher et al. | |
| 8,108,641 B2 | 1/2012 | Goss et al. | |
| 8,381,288 B2 | 2/2013 | Sahita et al. | |
| 8,464,011 B2 | 6/2013 | Krig | |
| 8,479,286 B2 | 7/2013 | Dalcher et al. | |
| 8,485,440 B1 | 7/2013 | Arora et al. | |
| 8,572,400 B2 | 10/2013 | Lin et al. | |
| 8,578,175 B2 | 11/2013 | Boivie et al. | |
| 8,600,883 B2 | 12/2013 | Wong | |
| 8,738,932 B2 | 5/2014 | Lee et al. | |
| 2001/0010722 A1 | 8/2001 | Enari | |
| 2001/0014157 A1 | 8/2001 | Hashimoto et al. | |
| 2001/0050990 A1 | 12/2001 | Sudia | |
| 2002/0064283 A1 | 5/2002 | Parenty | |
| 2002/0172368 A1 | 11/2002 | Peterka | |
| 2003/0084346 A1 | 5/2003 | Kozuch et al. | |
| 2004/0010778 A1 | 1/2004 | Kaler | |
| 2004/0039926 A1 | 2/2004 | Lambert | |
| 2004/0123127 A1 | 6/2004 | Teicher et al. | |
| 2004/0139346 A1 | 7/2004 | Watt et al. | |
| 2004/0181303 A1 | 9/2004 | Walmsley | |
| 2004/0215876 A1 | 10/2004 | Roberti | |
| 2005/0038998 A1 | 2/2005 | Ueno et al. | |
| 2005/0044390 A1 | 2/2005 | Trostle | |
| 2005/0044534 A1 | 2/2005 | Darweesh et al. | |
| 2005/0076226 A1 | 4/2005 | Boivie et al. | |
| 2005/0105738 A1 | 5/2005 | Hashimoto | |
| 2005/0166069 A1 | 7/2005 | Hashimoto et al. | |
| 2005/0177742 A1 | 8/2005 | Benson et al. | |
| 2006/0106801 A1 | 5/2006 | Cox et al. | |
| 2006/0156418 A1 | 7/2006 | Polozoff | |
| 2006/0242611 A1 | 10/2006 | Drake | |
| 2007/0006294 A1 | 1/2007 | Hunter | |
| 2007/0033281 A1 | 2/2007 | Hwang et al. | |
| 2007/0047735 A1 | 3/2007 | Celli et al. | |
| 2007/0101124 A1 | 5/2007 | Pitts | |
| 2007/0133795 A1 | 6/2007 | Kahn et al. | |
| 2007/0168997 A1 | 7/2007 | Tran | |
| 2007/0294671 A1 | 12/2007 | Demetriou et al. | |
| 2008/0072068 A1 | 3/2008 | Wang et al. | |
| 2008/0109903 A1 | 5/2008 | Werner et al. | |
| 2008/0155273 A1 | 6/2008 | Conti | |
| 2008/0222420 A1 | 9/2008 | Serret-Avila | |
| 2008/0282093 A1 | 11/2008 | Hatakeyama | |
| 2008/0288786 A1 | 11/2008 | Fiske | |
| 2008/0301441 A1 | 12/2008 | Calman et al. | |
| 2009/0006796 A1 | 1/2009 | Chang et al. | |
| 2009/0006864 A1 | 1/2009 | Hashimoto et al. | |
| 2009/0063651 A1 | 3/2009 | Brahmavar | |
| 2009/0217385 A1 | 8/2009 | Teow et al. | |
| 2009/0259857 A1 | 10/2009 | Gehrmann | |
| 2009/0300366 A1 | 12/2009 | Gueller et al. | |
| 2009/0319782 A1 | 12/2009 | Lee | |
| 2010/0031061 A1 | 2/2010 | Watanabe et al. | |
| 2010/0119068 A1 | 5/2010 | Harris | |
| 2010/0125509 A1 | 5/2010 | Kranzley et al. | |
| 2010/0153746 A1 | 6/2010 | Takeuchi et al. | |
| 2010/0161904 A1 | 6/2010 | Cypher et al. | |
| 2010/0162049 A1 | 6/2010 | Stall et al. | |
| 2010/0262824 A1 | 10/2010 | Keshavachar et al. | |
| 2010/0279610 A1 | 11/2010 | Bjorhn et al. | |
| 2010/0281273 A1 | 11/2010 | Lee et al. | |
| 2010/0332843 A1 | 12/2010 | Boivie et al. | |
| 2010/0332850 A1 | 12/2010 | Boivie et al. | |
| 2011/0064217 A1 | 3/2011 | Fry et al. | |
| 2011/0191244 A1 | 8/2011 | Dai | |
| 2012/0006891 A1 | 1/2012 | Zhou et al. | |
| 2012/0151265 A1 | 6/2012 | Bender et al. | |
| 2012/0159581 A1 | 6/2012 | Saint-Hilaire | |
| 2012/0216051 A1 | 8/2012 | Boivie et al. | |
| 2013/0061058 A1 | 3/2013 | Boivie et al. | |
| 2013/0097034 A1 | 4/2013 | Royyuru et al. | |
| 2014/0181533 A1 | 6/2014 | Boivie et al. | |
| 2014/0245266 A1 | 8/2014 | Sun | |
| 2015/0033078 A1 | 1/2015 | Wintergerst et al. | |
| 2015/0033205 A1 | 1/2015 | Wintergerst et al. | |

FOREIGN PATENT DOCUMENTS

| | | |
|---|---|---|
| JP | 2006-227777 | 8/2006 |
| WO | 9854633 | 12/1998 |
| WO | 2008003833 A1 | 1/2008 |
| WO | 2012111019 A1 | 8/2012 |
| WO | 2013177500 A1 | 11/2013 |

OTHER PUBLICATIONS

P. Williams et al., "CPU Support for Secure Executables", the 4th International Conference on Trust and Trustworthy Computing, 2011, Pittsburgh, PA, pp. 1-15.

P. Williams et al., "CPU Support for Secure Executables", Stony Brook University Power Point Presentation at the 4th International Conference on Trust and Trustworthy Computing, 2011, Pittsburgh, PA, pp. 1-23.

H. Levy, "Capability-Based Computer Systems", Digital Press, 1984, pp. 1-229.

T. Linden, "Operating System Structure to Support Security and Reliable Software", Institute for Computer Sciences and Technology, National Bureau of Standards, Washington, DC, ACM Computing Survey, vol. 8, No. 4, Dec. 1976, pp. 1-56.

Canetti et al., "A Two Layers Approach for Securing an Object Store Network", Proceedings of the First International IEEE Security in Storage Work-Shop, 2002, pp. 1-14.

Wang et al., "Keep Passwords Away from Memory: Password Caching and Verification Using TPM", 22nd International Conference on Advanced Information Networking and Applications, IEEE, pp. 755-762.

Catrein et al., "Private Domains in Networks of Information", IEEE International conference Communications Work-Shops, 2009, pp. 1-5.

D. Frincke, "Developing Secure Objects", Proceedings of the 19th National Information Systems Security Conference, 1996, pp. 410-419.

(56) References Cited

OTHER PUBLICATIONS

Somogyi et al., "Secure, Object-Oriented, Client-Server Middleware", Information Networking Institute, Carnegie Mellon University, 1998, pp. 1-21.
SAP AG, "Crystal Reports Server—A Functional Overview", SAP AG, Sap Functions in Detail, 2009, pp. 1-15.
Haifeng et al., "Memory Confidentiality and Integrity Protection Method Based on Variable Length Counter", IEEE, 2012, pp. 290-294. (Abstract Only).
U.S. Appl. No. 12/492,738—Final Office Action mailed Feb. 12, 2014.
U.S. Appl. No. 12/492,738—Notice of Allowance mailed May 5, 2014.
Suh et al., "Efficient Memory Integrity Verification and Encryption for Secure Processors", IEEE, 36th International Symposium on Microarchitecture, 2003, pp. 1-12.
Yang et al., "Fast Secure Processor for Inhibiting Software Piracy and Tampering", IEEE, 36th International Symposium on Microarchitecture, 2003, pp. 1-10.
U.S. Appl. No. 14/017,555—Non-Final Office Action mailed May 30, 2014.
U.S. Appl. No. 13/033,455—Notice of Allowance mailed Jul. 7, 2014.
U.S. Appl. No. 14/017,555—Final Office Action mailed Dec. 3, 2014.
International Searching Authority, Written Opinion for PCT/CN2014/089005 mailed Jan. 21, 2015.
International Searching Authority, Written Opinion for PCT/CA2014/050685, mailed Oct. 23, 2014.
Pirker, M. et al., "A Framework for Privacy-Preserving Mobile Payment on Security Enhanced ARM TrustZone Platforms", Proceedings of 2012 IEEE 11th International Conference on Trust, Security and Privacy in Computing and Communications, Jun. 2012, pp. 1155-1160. (Abstract Only).
Gao, J. et al., "A 2D Barcode-Based Mobile Payment System", Proceedings of the Third International Conference on Multimedia and Ubiquitous Engineering, Jun. 2009, pp. 320-329. (Abstract Only).
U.S. Appl. No. 14/101,916—Non-Final Office Action mailed Jan. 28, 2015.
U.S. Appl. No. 14/101,916—Non-Final Office Action mailed Apr. 9, 2015.
U.S. Appl. No. 13/226,079—Non-Final Office Action Mailed Aug. 14, 2013.
U.S. Appl. No. 13/033,367—Notice of Allowance Mailed Jul. 23, 2013.
U.S. Appl. No. 13/033,367—Final Office Action Mailed Mar. 25, 2013.
U.S. Appl. No. 13/033,367—Non-Final Office Action Mailed Nov. 9, 2012.
U.S. Appl. No. 12/878,696—Final Office Action Mailed Oct. 4, 2013.
U.S. Appl. No. 12/878,696—Non-Final Office Action Mailed Mar. 18, 2013.
U.S. Appl. No. 13/033,455—Final Office Action Mailed Jul. 16, 2013.
U.S. Appl. No. 13/033,455—Non-Final Office Action Mailed Nov. 20, 2012.
International Bureau, International Application No. PCT/US2010/001811—Preliminary Report on Patentability Mailed Jan. 12, 2012.
U.S. Appl. No. 12/492,738—Non-Final Office Action Mailed Aug. 14, 2013.
U.S. Appl. No. 12/492,738—Final Office Action Mailed Jun. 5, 2013.
U.S. Appl. No. 12/492,738—Non-Final Office Action Mailed Mar. 26, 2013.
J. Markoff, "Killing the Computer to Save It", The New York Times, www.nytimes.com, Oct. 29, 2012, pp. 1-6.
Arm Limited, "Arm Security Technology: Building a Secure System Using Trustzone Technology", Arm Limited, Apr. 2009, pp. 1-108.

SECURE APPLICATION DEBUGGING

BACKGROUND

The present disclosure relates to the field of computers, and specifically to computers on a network. Still more particularly, the present disclosure relates to debugging computer applications by a computer on a network.

Computer networks often include a server computer and one or more client computers. The server computer often handles operations on behalf of the client computer, such as executing applications, providing memory and computing resources, etc. Such operations performed by the server often require a high level of trust between the client and the server, which may or may not be warranted, particularly during debugging operations, due to insecure connections between the server and client, distrust of who is able to access the server, etc.

SUMMARY

A method, system, and/or computer program product enables secure debugging of a software application. A first computer receives a secure software application from a second computer. Access to data used by the secure software application is protected by a security object. The security object allows a processor to access the data used by the secure software application without permitting data to exit unprotected from the processor. The first computer receives a secure sidecar debugging application from the second computer, where the secure sidecar debugging application is designed to debug the secure software application, where the secure sidecar debugging application is encrypted, and where the second computer, but not the first computer, has a copy of a private key needed to decrypt the secure sidecar debugging application. In response to detecting an error in execution of the secure software application within the first computer, the first computer transmits the secure software application and the secure sidecar debugging application to the second computer, such that the second computer is enabled to decrypt the secure sidecar debugging application and to debug the secure software application.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
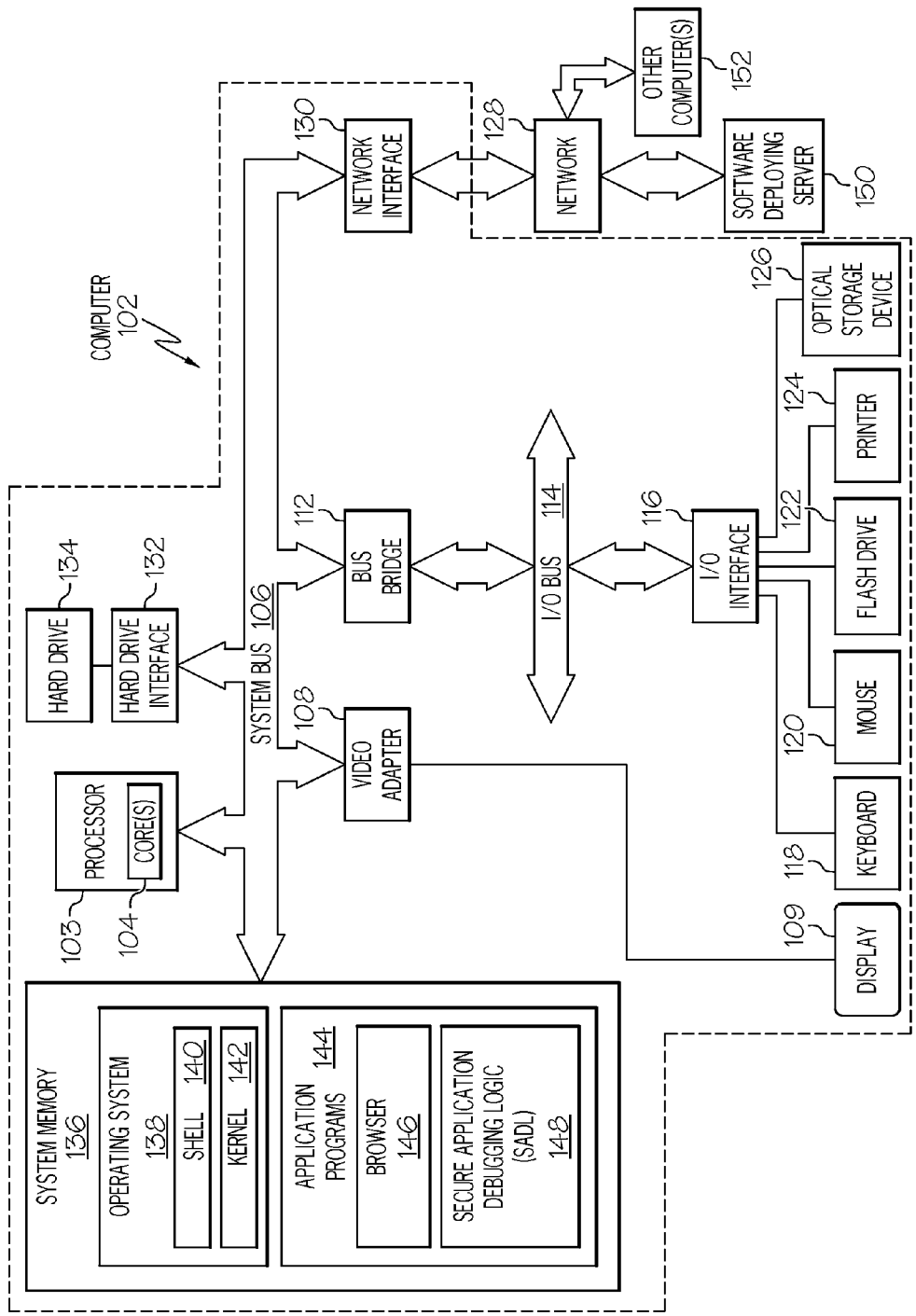
FIG. 1 depicts an exemplary computer system and/or network which may be utilized by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and particularly to FIG. 1, there is depicted a block diagram of an exemplary computer 102, which the present invention may utilize. Note that some or all of the exemplary architecture shown for computer 102 may be utilized by software deploying server 150 and/or other computer(s) 152.

Computer 102 includes a processor 103, which may utilize one or more processors each having one or more processor cores 104. Processor 103 is coupled to a system bus 106. A video adapter 108, which drives/supports a display 109, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and an optical storage device 126 (e.g., a CD or DVD drive). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Secure Application Debugging Logic (SADL) 148. SADL 148 includes code for implementing the processes described below in FIGS. 2-7. In one embodiment, computer 102 is able to download SADL 148 from software deploying server 150, including in an on-demand basis. Note further that, in one embodiment of the present invention, software deploying server 150 performs all of the functions associated with the present invention (including execution of SADL 148), thus freeing computer 102 from having to use its own internal computing resources to execute SADL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
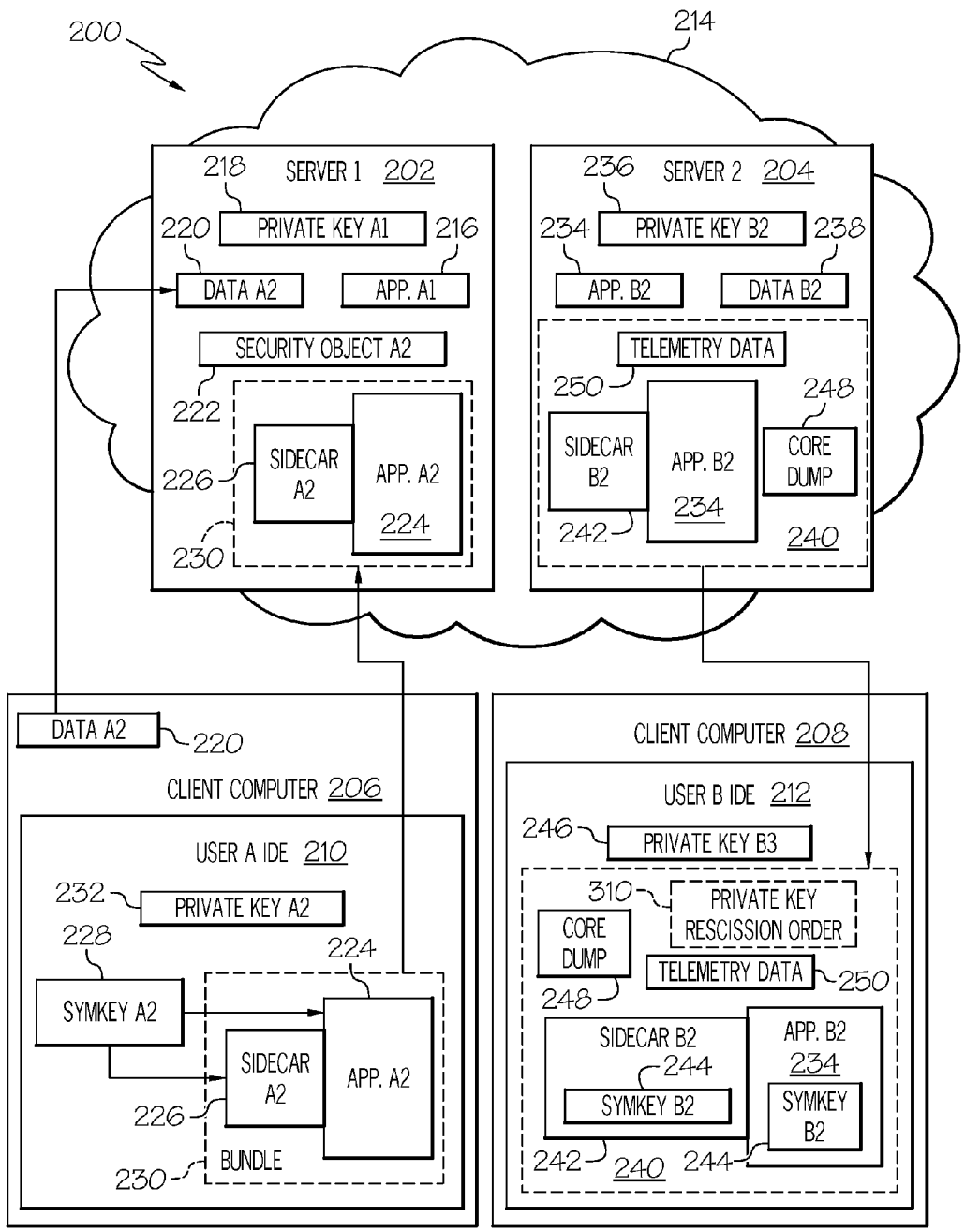
FIG. 2 illustrates a functional relationship between servers and clients in a network in accordance with one embodiment of the present invention.

With reference now to FIG. 2, a functional relationship between servers and clients in a network in accordance with one embodiment of the present invention is presented in a system 200. Assume that computer 102 depicted in FIG. 1 represents server 1 (202) or server 2 (204) in FIG. 2, and that other computer(s) 152 from FIG. 1 in FIG. 1 represent client computer 206 and client computer 208 in FIG. 2. Client computer 206 is used by User A, who utilizes a User A integrated development environment 210, while client computer 208 is used by User B, who utilizes a User B IDE 212. As known to those skilled in the art of computer development and debugging, an IDE is a software application that provides resources used to create, modify, edit, and/or manage a software application. An IDE typically includes a source code text editor and a compiler, which are presented to the code developer (i.e., software engineer) via a user interface (e.g., on a display such as display 109 shown in FIG. 1).

In system 200, server 202 and server 204 are part of a cloud 214, which is a network of connected resources (including server 202 and server 204). Assume for exemplary purposes that cloud 214 is managed by a service provider, which provides resources (e.g., processing servers, memory storage, etc.) needed to execute software programs on behalf of the service provider's customers/clients. For example, assume that a user of client computer 206 desires to have an application A1 (216) (i.e., a "secure software application") run on its behalf by server 202. Assume further that application 216 is encrypted, but that server 202 has access to a private key A1 (218), which can decrypt application 216. As depicted, data that is input into application 216 comes from the client computer 206 as data A2 (220). However, in order to provide an additional layer of security in the operations performed by server 202 on behalf of the client who owns client computer 206, data 220 is sent to server 202 from client computer 206 in a protected form.

Figure 3:
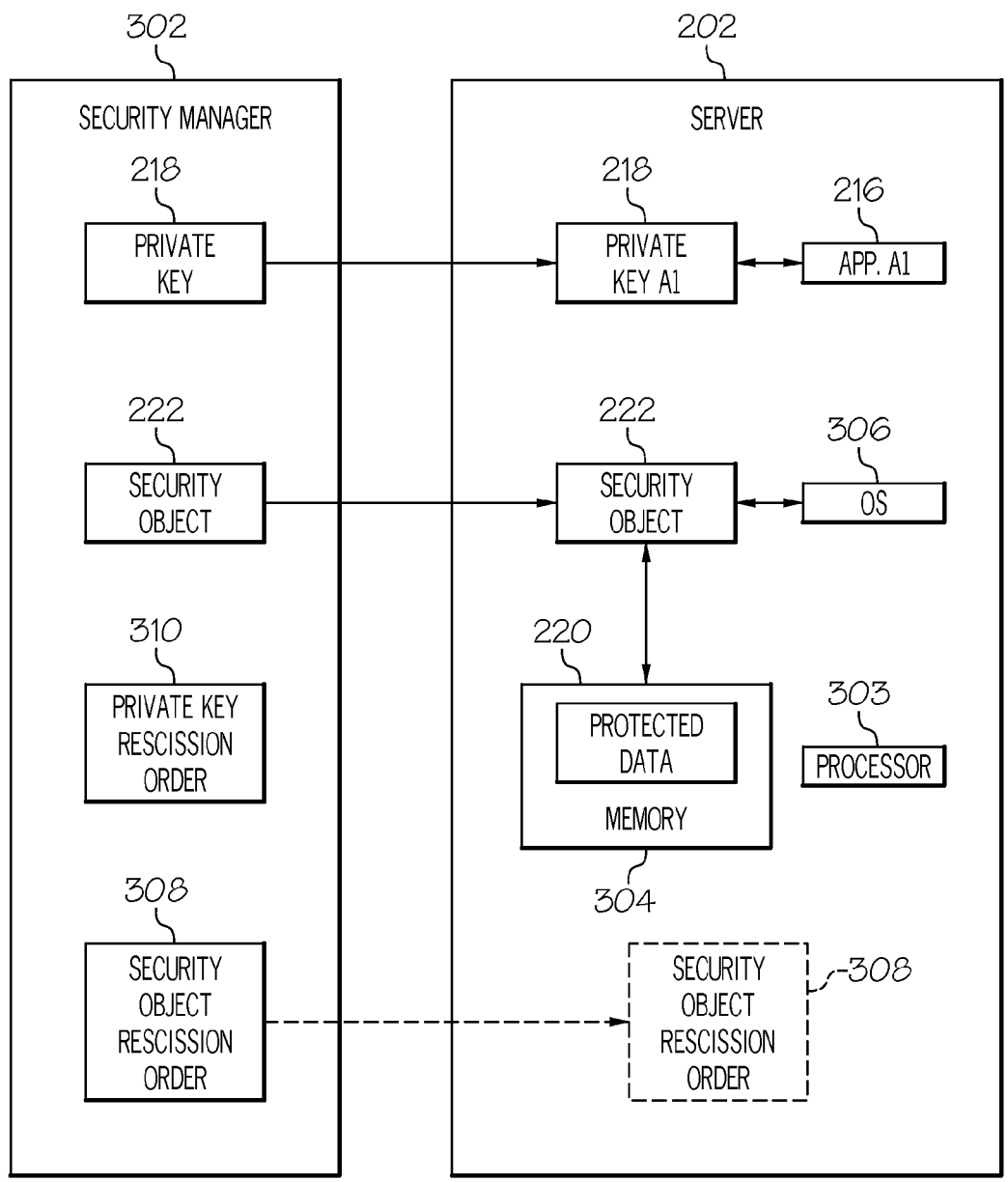
FIG. 3 depicts additional detail of data protection within a server on a network.

With reference now to FIG. 3, additional detail of data protection within a server on a network is presented. As noted above, application 216 may be encrypted. Thus, a private key 218 can be sent to the server 202 from a security manager 302 (e.g., a server and/or service that uses another of the other computer(s) 152 depicted in FIG. 1). In addition, the security manager 302 can send a security object 222 to server 202. The security object 222 is required to access an application (e.g., application 216) or protected data (e.g., protected data 220) from a memory 304 within (or used by) the server 202. Memory 304 may be system memory, L3 cache memory, or even persistent memory (e.g., a flash drive, a hard drive, etc.) used by server 202. Assume now that an operating system (OS) 306 within server 202 wants the processor 303 in server 202 to use protected data 220 as inputs to application 216. Rather than trust OS 306 to directly access the protected data 220 in memory 304, security object 222 must be used, as depicted in exemplary manner in FIG. 4. In one embodiment, security object 222 is compilable and/or executable software code that performs the processes described herein to access protected data 220. In another embodiment, security object 222 is a credential, token, key, or other object that is used by an executable program to afford access to the protected data 220 described herein.

Figure 4:
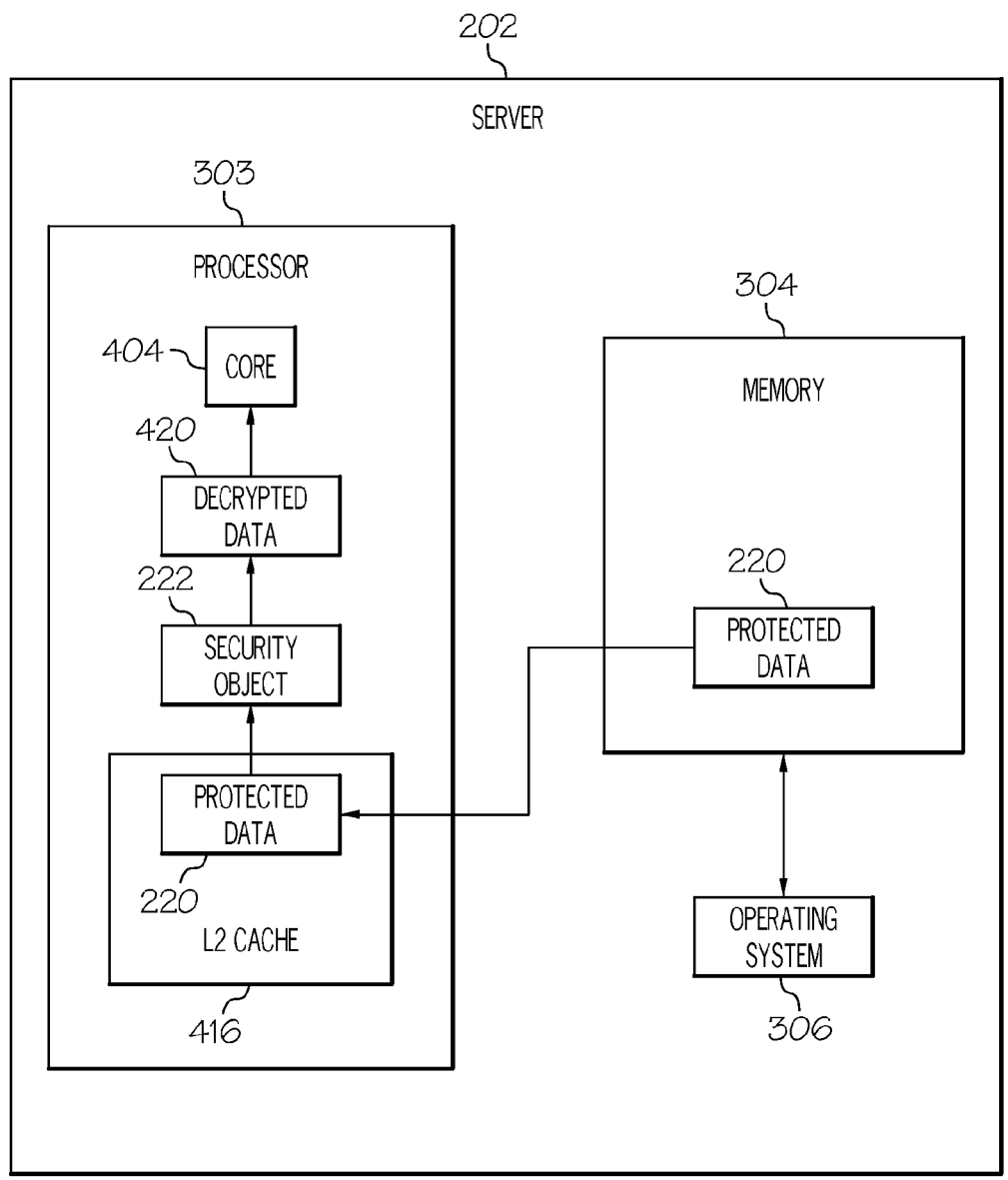
FIG. 4 illustrates additional detail of protected data being sent to a cache within a processor used in a server on a network.

With reference now to FIG. 4, additional detail of protected data 220 in a server 202 on a network is presented. Assume that protected data 220 is encrypted. According to one embodiment of the present invention, however, rather than decrypting the protected data before sending it to a cache (e.g., L2 cache 616—see FIG. 6), the protected data 220 is sent to L2 cache 416 in its encrypted form. In this encrypted form (as originally received from the client 206 (see FIG. 2), application 216 (see FIG. 3) is unable to use protected data 220 as inputs. However, as depicted in FIG. 4, the security object 222 is able to decrypt the protected data 220 within the processor 303 in order to generate decrypted data 420, which can then be sent to the core 404 (for example and more specifically, to an L1 data cache 620—see FIG. 6) of processor 303 for execution. Note again that this decryption takes place within the processor 303, and decrypted data is allowed only within the confines of processor 303. That is, the decrypted data 420 cannot leave the confines of the processor 303, but rather must be re-encrypted before being sent to memory 304 or other resources that are outside of the processor 303. Since all actions taken to decrypt the protected data 220 occur within the processor 303, a user of processor 303 (e.g., the owner of server 202 (see FIGS. 2-3) is unable to access, in a usable/decrypted form, potentially sensitive data that is provided by the owner of the client computer 206.

Figure 5:
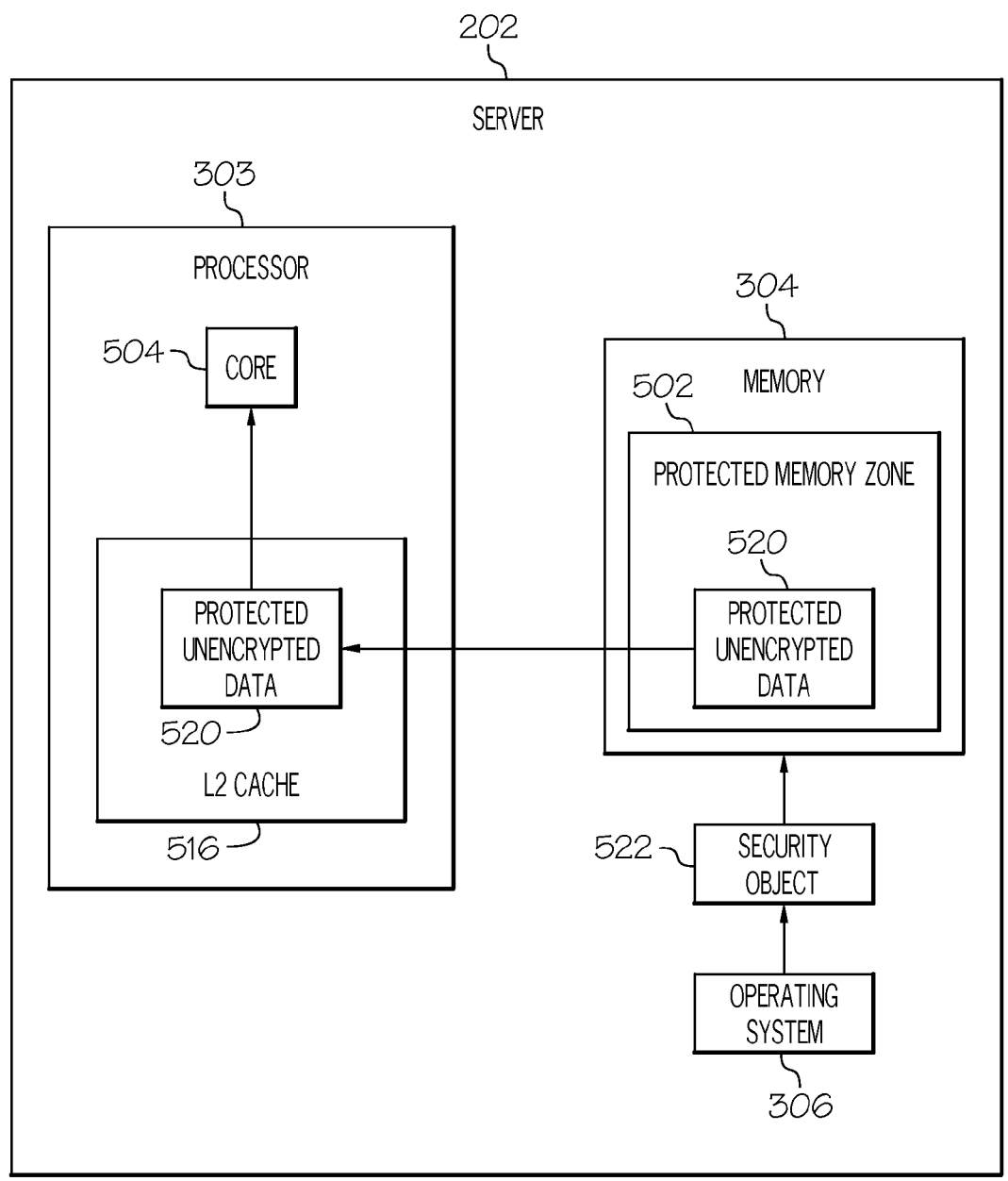
FIG. 5 depicts additional detail of protected data being stored within a protected memory zone within a server.

While FIG. 4 depicts a process of protecting sensitive data from the owner of server 202 through the use of encyrption, FIG. 5 depicts a process for protecting data by storing data within a protected memory zone within a server. For example and with reference to FIG. 5, assume that OS 306 wants to access protected unencrypted data 520 in memory 304. As the name implies, protected unencrypted data 520 is unencrypted. However, it is stored in an area of memory 304 that is protected (i.e., protected memory zone 502). Access to protected memory zone 502 is not possible without executing a security object 522. Security object 522 is similar to the security object 222 shown in FIG. 3, in that it may be issued by a security manager 302. However, rather than provide decryption, security object 522 provides access to protected memory zone 502. That is, security object 522 contains a security algorithm/key/password, which is required by a memory manager (not shown) to allow the operating system 306 to access the protected memory zone 502. If the server 202 has a copy of the security object 522 (i.e., it has been received from the security manager 302 shown in FIG. 3), then the protected unencrypted application 520 is loaded into L2 cache 516 (or other operational memory) for use by core 504 within processor 303. Note that the protected unencrypted data 520 is still protected from malicious attack via the (unprotected) operating system 306, since it 1) cannot be accessed outside of the processor 303 and/or memory 304, and 2) can only be accessed through the use of the security object 522.

Note that while memory 304 and protected memory zone 502 are depicted in FIG. 5, as being outside of processor 303, in one embodiment memory 304 and protected memory zone 502 are actually within (inside of) processor 303. This provides additional protection of the protected unencrypted data 520, such that it can be accessed and utilized only within the processor 303.

Note further that while, for purposes of clarity, the memory 304 shown in FIG. 3 depicts only the protected data 220 as being contained within memory 304, is it understood in one embodiment that memory 304 (e.g., system memory) will also contain OS 306, security object 222, application A1 (216) and/or private key A1 (218), as may be required for implementing the invention disclosed herein.

Returning now to FIG. 2, assume that an application being run by server 202 fails. As stated above, the owner of client 206 may not trust server 202 to access its data 220, much less debug application 216. However, the owner of client computer 206 does trust server 202 enough to hold a copy of 1) the application and 2) a debugging program, but where the debugging program is in a protected form. For example, assume that an application A2 (224) can only be debugged by a debugging program depicted as sidecar A2 (226). Application 224 and/or sidecar 226 are encrypted by a symmetric key A2 (228), which is a pair of keys that includes a public key (for encryption) and private key (for decryption). The encrypted versions of application 224 and/or sidecar 226 together make up a bundle 230, as depicted. In order to utilize bundle 230 (i.e., in order to decrypt application 224 using sidecar 226), the sidecar 226 and/or application 224 must be decrypted by a private key 232, which is available to client computer 206, but not to server 202.

For example, assume that server 204 is running application B2 234 (i.e., another "secure software application") when an error to application 234 occurs (e.g., the program "crashes"—stops running, or generates non-fatal error messages, or starts generating outputs that are known to be erroneous (e.g., are in an improper format, such as outputting numbers instead of text, etc.), or starts using more CPU/memory resources than expected, etc.). As with application 216 described above, application 234 was decrypted by private key B2 (236) prior to use, and access to data B2 (238) required the use of a security object (not shown, but analogous to security object A2 (222) described herein).

When application 234 crashed, a bundle 240, comprising the application B2 (234) and a sidecar B2 (242) (similar to sidecar 226 discussed herein), is sent from the server 204 to the User B IDE 212 in client computer 208. Note that sidecar 242 is protected by a symmetric key B2 (244) (i.e., a key pair of a public key used for encryption and a private key (e.g., private key B3 246) used for decryption). In one embodiment, the application 234 is also protected by symmetric key 244. In order to utilize the sidecar 242, the client computer 208 first decrypts the sidecar 242 using a private key B3 (246), which is accessible to the client computer 208 but not the server 204. Thus, client computer 208 is able to debug the application 234, but server 204 is not.

In one embodiment, the bundle 240 of information sent to the client computer includes a core dump 248. Core dump 248 includes a recorded state of memory being used by an application (e.g., application 234) at the time of the fault/error/crash. The core dump 248 includes contents of a program counter, stack pointer, OS flags, etc. In one embodiment, the core dump specifically includes contents of the L1 instruction cache 618, the L1 data cache 620, the L2 cache 616, the CRR 680, LCR 682, GPR 684, and/or FPR 688 depicted and described below in FIG. 6. In one embodiment, the core dump contain information related to higher-level descriptions of processing (e.g., a pointer to a line of source and/or object code at which the error occurred, a flag that was raised by the error, etc.).

In one embodiment, the bundle 240 of information sent to the client computer 208 includes telemetry data 250. The telemetry data 250 describes the operation of the processor and/or core within the server at the time of the crash. Examples of such operational data include, but are not limited to, the bandwidth (i.e., how many calculations per unit of time are being executed) of the processor/core, memory accesses (i.e., the quantity of memory accesses made by the processor during a predefined time period), etc.

While the process of using sidecar 226 or sidecar 242 may require decrypting sidecar 226 or sidecar 242 before use, in one embodiment sidecar 226 or sidecar 242 are protected by a security object, such as security object 222 or security object 522 described herein. That is, rather than allow an operating system within a client (e.g., client computer 206 or 208) to directly access sidecar 226 or sidecar 242 after decryption, one embodiment requires the operating system within the client to go through a security object (e.g., 222/522), such that the sidecar 226 or sidecar 242 is accessible only within a processor that is within the client computer.

Figure 6:
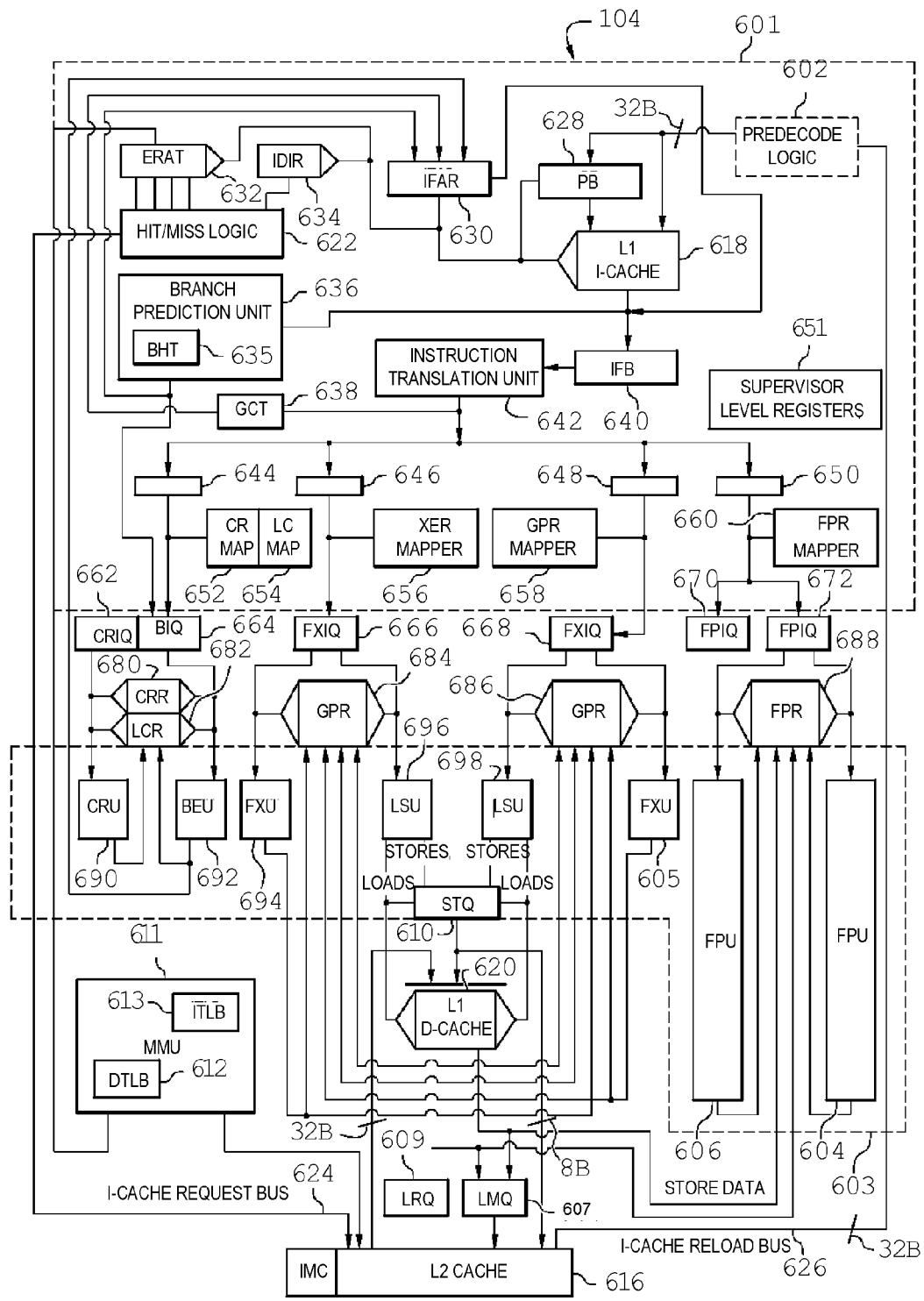
FIG. 6 illustrates additional detail of a core within a processor.

With reference now to FIG. 6, additional exemplary detail of core 104/404/504, as respectively depicted in FIGS. 1, 4, and 5, as well as the core of a processor used by a client computer such as client computers 206 and/or 208 in FIG. 2, is presented. Core 104 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618 and 620 provide low latency access to cache lines corresponding to memory locations in system memories (e.g., system memory 136 shown in FIG. 1).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 104, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes Data Translation Lookaside Buffer (DTLB) 612 and Instruction Translation Lookaside Buffer (ITLB) 613. Each TLB contains recently referenced page table entries, which are accessed to translate EAs to RAs for data (DTLB 612) or instructions (ITLB 613). Recently referenced EA-to-RA translations from ITLB 613 are cached in EOP effective-to-real address table (ERAT) 632.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 I-cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 104, ITU 642 translates instructions from user instruction set architecture (UISA) instructions into a possibly different number of internal ISA (IISA) instructions that are directly executable by the execution units of core 104. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648 and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670 and 672, instructions can be issued opportunistically to the execution units of processor 103 (shown in FIG. 1) for execution as long as data dependencies and antidependencies are observed. The instructions, however, are maintained in issue queues 662-672 until execution of the instructions is complete and the result data, if any, are written back, in case any of the instructions need to be reissued.

As illustrated, the execution units of core 104 include an execution subcomponent 603, which includes a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files, and store fixed-point and integer values accessed and produced by FXUs 694 and 605 and LSUs 696 and 698. Note that floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution unit notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register(s) to one or more architected registers within the appropriate register file. The instruction is then removed from the issue queue and once all instructions within its instruction group have been completed, it is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core 104 or from system memory. LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

Note that the state of a processor includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. In core 104 of FIG. 6, the hard state includes the contents of user-level registers, such as CRR 680, LCR 682, GPRs 684 and 686, FPR 688, as well as supervisor level registers 651. The soft state of core 104 includes both "performance-critical" information, such as the contents of L1 I-cache 618, L1 D-cache 620, address translation information such as DTLB 612 and ITLB 613, and less critical information, such as BHT 635 and all or part of the content of L2 cache 616. Thus, the content of such registers are fixed values that describe a real-time current architecture state register of the processor core 104.

Thus, in one embodiment, the content of the core dump 248 depicted in FIG. 2 contains the "hard" state and/or the "soft" state of the core, as described/defined above.

In one embodiment of the present invention, the decoded/decrypted data is loaded directly into the L1 D-cache 620 depicted in FIG. 6, thus bypassing the LSU 696/698, STQ 610, etc. In one embodiment, the decrypted data 420 is sent to the L2 cache 616, depicted in FIG. 6, from which it is dispatched to the respective execution units.

Returning now to FIG. 3, as described above, security manager 302 is a server/service (e.g., using one or more of the other computer(s) 152 depicted in FIG. 1) that, among other functions, creates the security object 222. In one embodiment, each security object is specific for particular data. That is, a first security object may be designed to decrypt a first protected data; a second security object may be designed to decrypt a second protected data; etc. This allows a fine level of granularity for controlling which protected data can be decrypted/enabled for use by a server and/or a client.

Note again that in FIG. 4, in one embodiment the protected data 220 is unusable until they it is inside of the processor 303, where it is converted into its usable form using the security object 222. This ensures that the use of the protected data 220 cannot occur without the use of the security object 222, which use must occur inside of (within) the processor 303.

Figure 7:
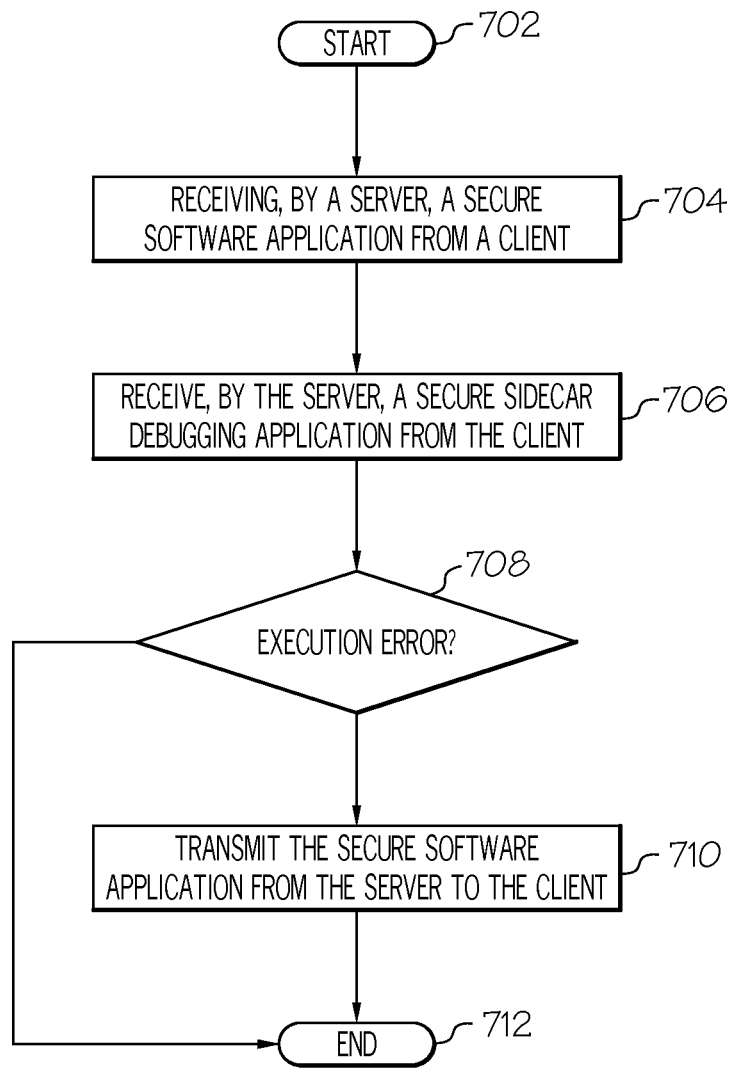
FIG. 7 is a high-level flow chart of exemplary steps taken by one or more processors to securely debug a software application within a client device.

With reference now to FIG. 7, a high-level flow chart of exemplary steps taken by one or more processors to securely enable the debugging of a software application. After initiator block 702, a server receives a secure software application from a client (block 704). The secure application is designed to execute within the server. However, access to data used by the secure software application is protected by a security object, which allows a processor within the server to access the data used by the secure software application without permitting data to exit unprotected from the processor.

As described in block 706, the server receives a secure sidecar debugging application from the client. The secure sidecar debugging application is designed to debug the secure application. In one embodiment, the secure sidecar debugging application is encrypted, such that the client, but not the server, has a copy of a private key needed to decrypt the secure sidecar debugging application.

As described in query block 708, a query is made as to whether an execution error (e.g., a crash, fault, etc.) has occurred when executing the secure software application within the server. As described in block 710, in response to detecting that there has been an error when executing the secure software application within the server, the secure software application is transmitted from the server to the client, thus allowing the client to debug the secure software application. The process ends at terminator block 712.

In one embodiment of the present invention, in response to detecting the error in execution of the secure software application within the server, the secure sidecar debugging application is transmitted from the server to the client (in case the client does not already have a copy of the secure sidecar debugging application needed to debug the secure software application).

In one embodiment of the present invention, in response to detecting an error in execution of the secure software application within the server, a core dump from a processor in the server that is executing the secure software application is generated, and then transmitted from the server to the client. In one embodiment, this core dump comprises contents of a data cache, an instruction cache, and a register within a core of the processor at a time of the error. In one embodiment, this core dump is encrypted before being transmitted from the server to the client.

In one embodiment of the present invention, in response to detecting the error in execution of the secure software application within the server, telemetry data is transmitted from the server to the client. In one embodiment, this telemetry data describes: a quantity of calculations per a first predefined time period, and a quantity of memory accesses per a second predefined time period, wherein the quantity of calculations and quantity of memory accesses occur during a third predefined time period before the error in execution of the secure software application occurred.

In one embodiment of the present invention, a security object rescission order is transmitted to the server, wherein the security object rescission order prevents the processor within the server from further utilizing the data required by the secure software application. For example and with reference again to FIG. 3, assume that server 202 is utilizing security object 222 to access protected data 220 needed for inputs to application 216. Security manager 302 can stop this process by sending a security object rescission order 308 to server 202, which blocks OS 306 from utilizing security object 222. That is, assume that each time protected data 220 is accessed through the use of the security object 222, only a limited amount of data (e.g., a line, page, block, heap, etc.) can be accessed before security object 222 must again be invoked (to access the next line/page/block/etc.). Thus, by disabling the security object 222, no new data can be accessed from the memory 304.

Similarly, a private key rescission order 310 can be sent to client computer 208 (see FIG. 2), thereby blocking the use of sidecar 242 to debug application 234. This blocking of sidecar 242 by private key rescission order 310 can be accomplished by corrupting private key 246, thus preventing further decryption of sidecar 242. That is, assume that only a limited section of application 234 can be debugged using sidecar 242 (via the use of private key 246). Thereafter, in order to debug a next section of application 234 (e.g., a next block of code, a next function of application 234, etc.), sidecar 242 must again be decrypted by private key 246. However, the private key rescission order 310 disables the private key 246 (e.g., by corrupting the private key 246, blocking access to the private key 246, etc.), thus preventing any further debugging of application 234. Note that if sidecar 242 is accessible only through a security object (e.g., 222 or 522 described above), then a rescission order can be issued from the security manager 302 (see FIG. 3) to client computer 208, thus selectively disabling that security object.

As described now and herein, and in further reference to FIG. 6, in one embodiment of the present invention the server comprises a processor, the processor comprises a core, and the core comprises a data cache. In one embodiment, the security object is able to push data directly onto the L1 D-cache 620, thus providing faster, and yet still secure, operations within the core. Note that L1 denotes lowest level of cache, which is first checked to locate an operand (in the case of a data (D) cache) or data (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of enabling secure debugging of a software application, the method comprising:
   receiving, by a first computer, a secure software application from a second computer, wherein access to data used by the secure software application is protected by a security object, and wherein the security object allows a processor to access the data used by the secure software application without permitting data to exit unprotected from the processor;
   receiving, by the first computer, a secure sidecar debugging application from the second computer, wherein the secure sidecar debugging application is designed to debug the secure software application, wherein the secure sidecar debugging application is encrypted, and wherein the second computer, but not the first computer, has a copy of a private key needed to decrypt the secure sidecar debugging application; and
   in response to detecting an error in execution of the secure software application within the first computer, transmitting the secure software application and the secure sidecar debugging application from the first computer to the second computer, wherein the second computer decrypts the secure sidecar debugging application and debugs the secure software application.

2. The method of claim 1, further comprising:
   in response to detecting the error in execution of the secure software application within the first computer, generating a core dump from a processor in the first computer that executed the secure software application; and
   transmitting the core dump from the first computer to the second computer.

3. The method of claim 2, wherein the core dump comprises contents of a data cache, an instruction cache, and a register within a core of the processor at a time of the error.

4. The method of claim 2, further comprising:
   encrypting the core dump before transmission to the second computer.

5. The method of claim 1, further comprising:
   in response to detecting the error in execution of the secure software application within the first computer, transmitting telemetry data from the first computer to the second computer, wherein the telemetry data describes:

a quantity of calculations per a first predefined time period, and a quantity of memory accesses per a second predefined time period, wherein the quantity of calculations and quantity of memory accesses occur during a third predefined time period before the error in execution of the secure software application occurred.

6. The method of claim 1, further comprising:

receiving a security object rescission order at the first computer, wherein the security object rescission order prevents the first computer from further utilizing the data used by the secure software application.

7. A computer program product for enabling secure debugging of a software application, the computer program product comprising a non-transitory computer readable storage medium having program code embodied therewith, the program code readable and executable by one or more processors to perform a method comprising:

receiving, by a first computer, a secure software application from a second computer, wherein access to data used by the secure software application is protected by a security object, and wherein the security object allows a processor to access the data used by the secure software application without permitting data to exit unprotected from the processor;

receiving, by the first computer, a secure sidecar debugging application from the second computer, wherein the secure sidecar debugging application is designed to debug the secure software application, wherein the secure sidecar debugging application is encrypted, and wherein the second computer, but not the first computer, has a copy of a private key needed to decrypt the secure sidecar debugging application; and in response to detecting an error in execution of the secure software application within the first computer, transmitting the secure software application and the secure sidecar debugging application from the first computer to the second computer, wherein the second computer is enabled to decrypt the secure sidecar debugging application and to debug the secure software application.

8. The computer program product of claim 7, wherein the method further comprises:

in response to detecting the error in execution of the secure software application within the first computer, generating a core dump from a processor in the first computer that executed the secure software application; and transmitting the core dump from the first computer to the second computer.

9. The computer program product of claim 8, wherein the core dump comprises contents of a data cache, an instruction cache, and a register within a core of the processor at a time of the error.

10. The computer program product of claim 8, wherein the method further comprises:

encrypting the core dump before transmission to the second computer.

11. The computer program product of claim 7, wherein the method further comprises:

in response to detecting the error in execution of the secure software application within the first computer, transmitting telemetry data from the first computer to the second computer, wherein the telemetry data describes:

a quantity of calculations per a first predefined time period, and a quantity of memory accesses per a second predefined time period, wherein the quantity of calculations and quantity of memory accesses occur during a third predefined time period before the error in execution of the secure software application occurred.

12. The computer program product of claim 7, wherein the method further comprises:

receiving a security object rescission order at the first computer, wherein the security object rescission order prevents the first computer from further utilizing the data used by the secure software application.

13. A computer system comprising:

a processor, a computer readable memory, and a computer readable storage medium;

first program instructions to receive, by a first computer, a secure software application from a second computer, wherein access to data used by the secure software application is protected by a security object, and wherein the security object allows a processor to access the data used by the secure software application without permitting data to exit unprotected from the processor;

second program instructions to receive, by the first computer, a secure sidecar debugging application from the second computer, wherein the secure sidecar debugging application is designed to debug the secure software application, wherein the secure sidecar debugging application is encrypted, and wherein the second computer, but not the first computer, has a copy of a private key needed to decrypt the secure sidecar debugging application; and third program instructions to, in response to detecting an error in execution of the secure software application within the first computer, transmit the secure software application and the secure sidecar debugging application from the first computer to the second computer, wherein the second computer is enabled to decrypt the secure sidecar debugging application and to debug the secure software application; and wherein the first, second, and third program instructions are stored on the computer readable storage medium and executed by the processor via the computer readable memory.

14. The computer system of claim 13, further comprising:

fourth program instructions to, in response to detecting the error in execution of the secure software application within the first computer, generating a core dump from a processor in the first computer that executed the secure software application; and fifth program instructions to transmit the core dump from the first computer to the second computer; and wherein the fourth and fifth program instructions are stored on the computer readable storage medium and executed by the processor via the computer readable memory.

15. The computer system of claim 14, wherein the core dump comprises contents of a data cache, an instruction cache, and a register within a core of the processor at a time of the error.

16. The computer system of claim 14, further comprising:

sixth program instructions to encrypt the core dump before transmission to the second computer; and wherein the sixth program instructions are stored on the computer readable storage medium and executed by the processor via the computer readable memory.

17. The computer system of claim 13, further comprising:

fourth program instructions to, in response to detecting the error in execution of the secure software application within the first computer, transmit telemetry data from the first computer to the second computer, wherein the telemetry data describes:
  a quantity of calculations per a first predefined time period, and
  a quantity of memory accesses per a second predefined time period, wherein the quantity of calculations and quantity of memory accesses occur during a third predefined time period before the error in execution of the secure software application occurred; and wherein
the fourth program instructions are stored on the computer readable storage medium and executed by the processor via the computer readable memory.

18. The computer system of claim 13, further comprising:
  fourth program instructions to receive a security object rescission order at the first computer, wherein the security object rescission order prevents the first computer from further utilizing the data used by the secure software application; and wherein
the fourth program instructions are stored on the computer readable storage medium and executed by the processor via the computer readable memory.

\* \* \* \* \*